(12) United States Patent
Park et al.

(10) Patent No.: US 11,658,307 B2
(45) Date of Patent: May 23, 2023

(54) METHOD AND APPARATUS FOR MANUFACTURING CORE-SHELL CATALYST

(71) Applicant: KOREA INSTITUTE OF ENERGY RESEARCH, Daejeon (KR)

(72) Inventors: Gu-Gon Park, Daejeon (KR); Sun-Mi Hwang, Daejeon (KR); Sung-Dae Yim, Daejeon (KR); Chang-Soo Kim, Incheon (KR); Won-Yong Lee, Daejeon (KR); Tae-Hyun Yang, Daejeon (KR); Seok-Hee Park, Daejeon (KR); Minjin Kim, Daejeon (KR); Young-Jun Sohn, Daejeon (KR); Byungchan Bae, Daejeon (KR); Seung-Gon Kim, Daejeon (KR); Dongwon Shin, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 504 days.

(21) Appl. No.: 16/738,840

(22) Filed: Jan. 9, 2020

(65) Prior Publication Data
US 2020/0161664 A1 May 21, 2020

Related U.S. Application Data

(62) Division of application No. 15/646,995, filed on Jul. 11, 2017, now Pat. No. 10,892,494.

(30) Foreign Application Priority Data

Dec. 7, 2016 (KR) ........................ 10-2016-0166142

(51) Int. Cl.
| | |
|---|---|
| *H01M 4/86* | (2006.01) |
| *H01M 4/92* | (2006.01) |
| *B01J 19/02* | (2006.01) |
| *B01J 19/08* | (2006.01) |
| *B01J 19/12* | (2006.01) |
| *B01J 23/44* | (2006.01) |
| *B01J 23/89* | (2006.01) |
| *B01J 35/00* | (2006.01) |
| *B01J 35/02* | (2006.01) |
| *B01J 37/02* | (2006.01) |

(52) U.S. Cl.
CPC ........... *H01M 4/8657* (2013.01); *B01J 19/02* (2013.01); *B01J 19/08* (2013.01); *B01J 19/087* (2013.01); *B01J 19/121* (2013.01); *B01J 23/44* (2013.01); *B01J 23/8926* (2013.01); *B01J 35/008* (2013.01); *B01J 35/0013* (2013.01); *B01J 35/0073* (2013.01); *B01J 35/023* (2013.01); *B01J 37/0221* (2013.01); *H01M 4/921* (2013.01); *H01M 4/925* (2013.01); *B01J 37/0225* (2013.01); *B01J 2219/029* (2013.01); *B01J 2219/0209* (2013.01); *B01J 2219/0803* (2013.01); *B01J 2219/089* (2013.01); *B01J 2219/0879* (2013.01); *B01J 2219/0892* (2013.01); *B01J 2219/12* (2013.01)

(58) Field of Classification Search
CPC ........ B01J 19/08; B01J 19/02; B01J 2219/12; B01J 23/8926; B01J 2219/0803; B01J 19/087; B01J 23/44; B01J 35/0073; B01J 35/023; B01J 2219/0892; B01J 37/0221; B01J 2219/029; B01J 35/0013; B01J 2219/089; B01J 19/121; B01J 2219/0209; B01J 37/0225; B01J 2219/0879; B01J 35/008; H01M 4/921; Y02E 60/50
See application file for complete search history.

(56) References Cited

U.S. PATENT DOCUMENTS

| | | | |
|---|---|---|---|
| 2009/0317289 A1 | 12/2009 | Ito et al. | |
| 2010/0197490 A1* | 8/2010 | Adzic | H01M 4/926 977/773 |
| 2011/0192714 A1 | 8/2011 | Liu et al. | |
| 2016/0260984 A1 | 9/2016 | Yamada et al. | |

FOREIGN PATENT DOCUMENTS

| | | | | |
|---|---|---|---|---|
| CN | 112 909 266 A | * | 6/2021 | ............ H01M 4/925 |
| KR | 10-0736538 B1 | | 7/2007 | |
| KR | 10-2009-0045412 A | | 5/2009 | |
| WO | WO 2009 135 189 A1 | * | 11/2009 | ............ H01M 4/921 |

(Continued)

OTHER PUBLICATIONS

Bonis (The Role of the solvent in the ultrashort Laser Ablation of Palladium target in liquid, Applied Physics A, 2014 vol. 117, pp. 211-216).
Cristoforetti (Production of Palladium Nanoparticles by Pulsed Laser Ablation in Water and Their Characterization, The Journal of Physical Chemistry C (2011), vol. 115 pp. 5073-5083).
Sasaki, Kot Aro et al., "Core-Protected Platinum Monolayer Shell High-Stability Electrocatalysts for Fuel-Cell Cathodes", Angew. Chem. Int. Ed. 2010, 49, pp. 8602-8607.
Wang, Jia X, et al., "Oxyaen Reduction on Well-Defined Core-Shell Nanocatalysts: Particle Size, Facet, and PT Shell Thickness Effects", J. Am. Chem. Soc., 2009, 131 (47), pp. 17298-17302.

(Continued)

*Primary Examiner* — Timothy C Vanoy
(74) *Attorney, Agent, or Firm* — Birch, Stewart, Kolasch & Birch, LLP

(57) ABSTRACT

The present disclosure relates to a method and an apparatus for manufacturing a core-shell catalyst, and more particularly, to a method and an apparatus for manufacturing a core-shell catalyst, in which a particle in the form of a core-shell in which the metal nanoparticle is coated with platinum is manufactured by substituting copper and platinum through a method of manufacturing a metal nanoparticle by emitting a laser beam to a metal ingot, and providing a particular electric potential value, and as a result, it is possible to continuously produce nanoscale uniform core-shell catalysts in large quantities.

4 Claims, 3 Drawing Sheets

(56) References Cited

FOREIGN PATENT DOCUMENTS

| WO | WO 2015/056485 A1 | 4/2015 | |
| WO | WO 2015 122 104 A1 * | 8/2015 | ................ B22F 1/17 |

OTHER PUBLICATIONS

Zeng et al., Nanometarial via Laser Ablation/Irridation in Liquid: A review, Adv. Funct. Mater. (2012) vol. 22, p. 1333-1353.

* cited by examiner

[FIG. 1]
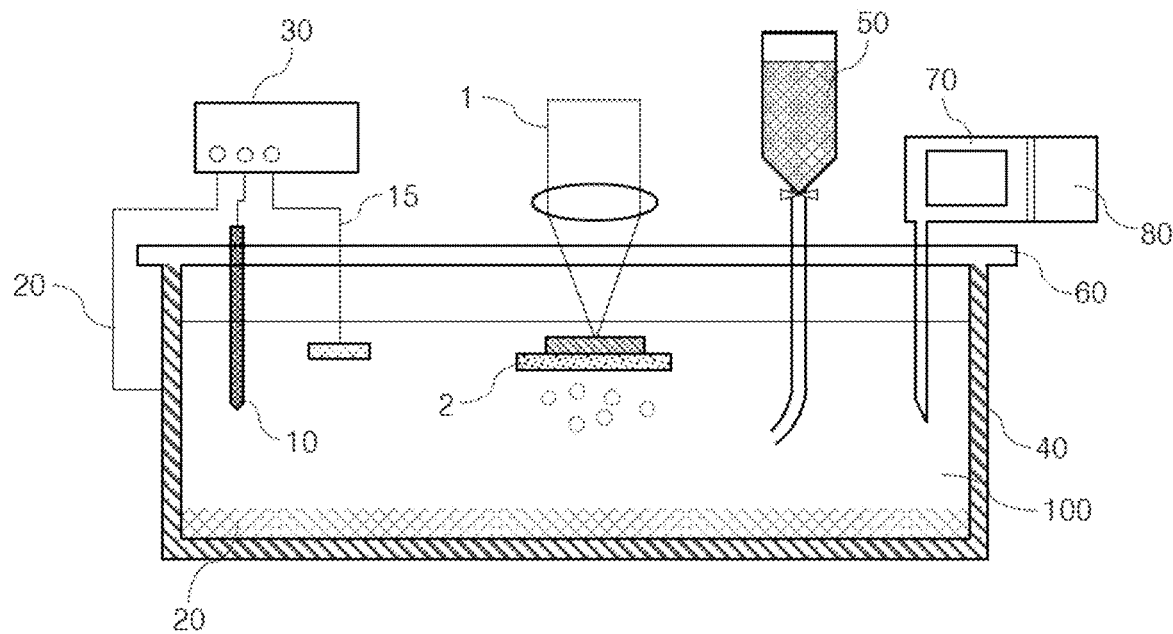
[FIG. 2]
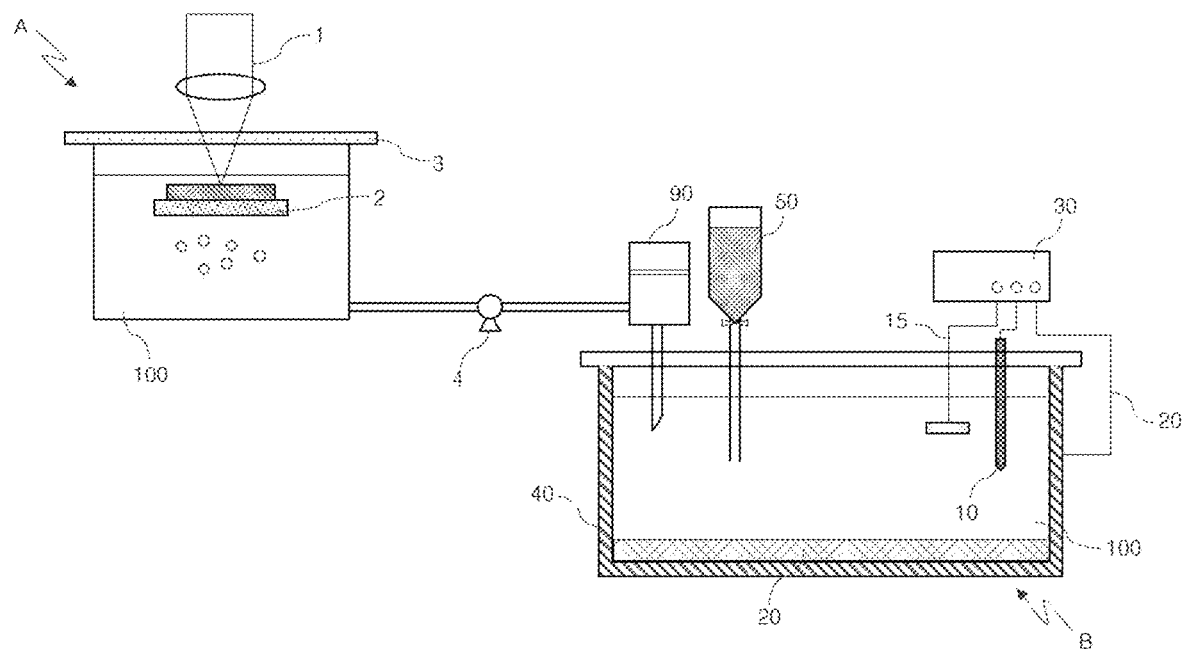

[FIG. 3]
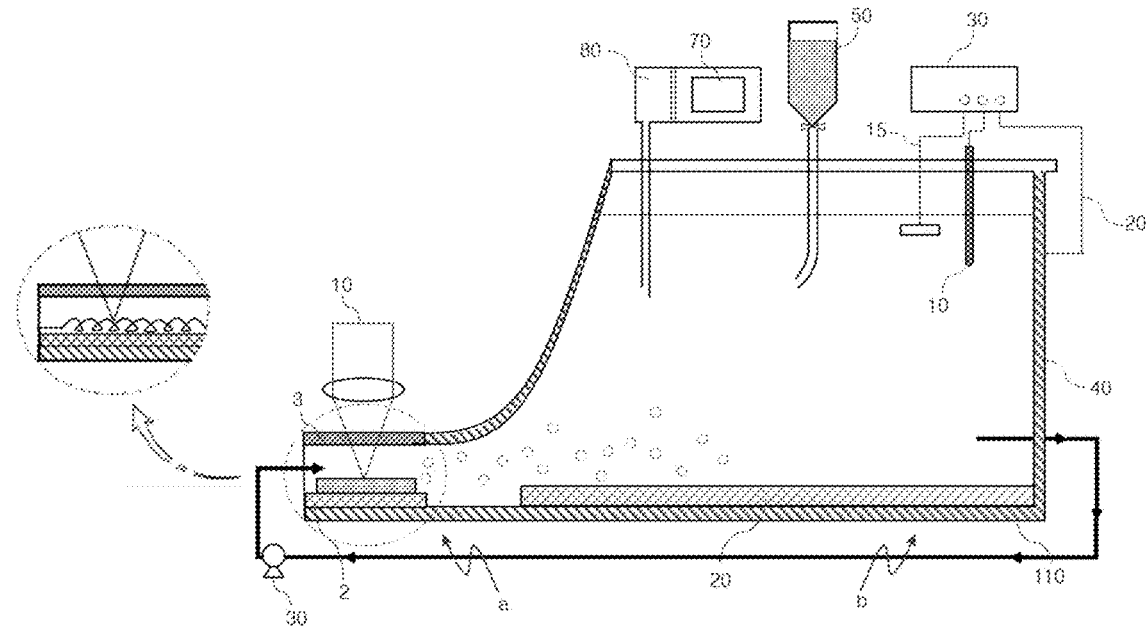
[FIG. 4]
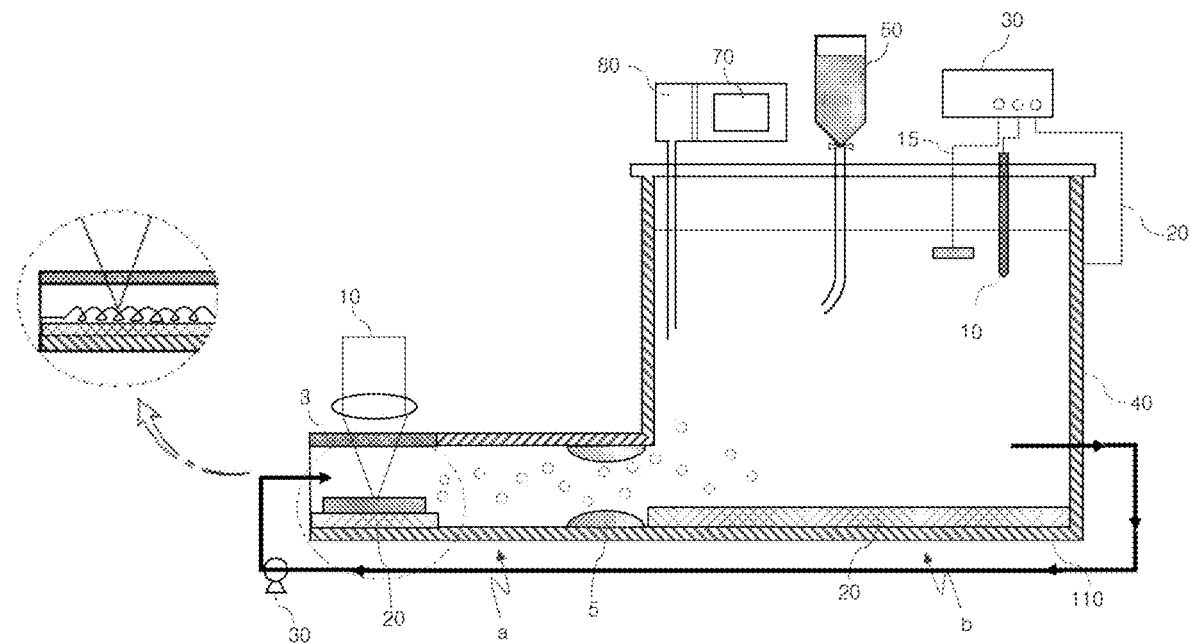

[FIG. 5]
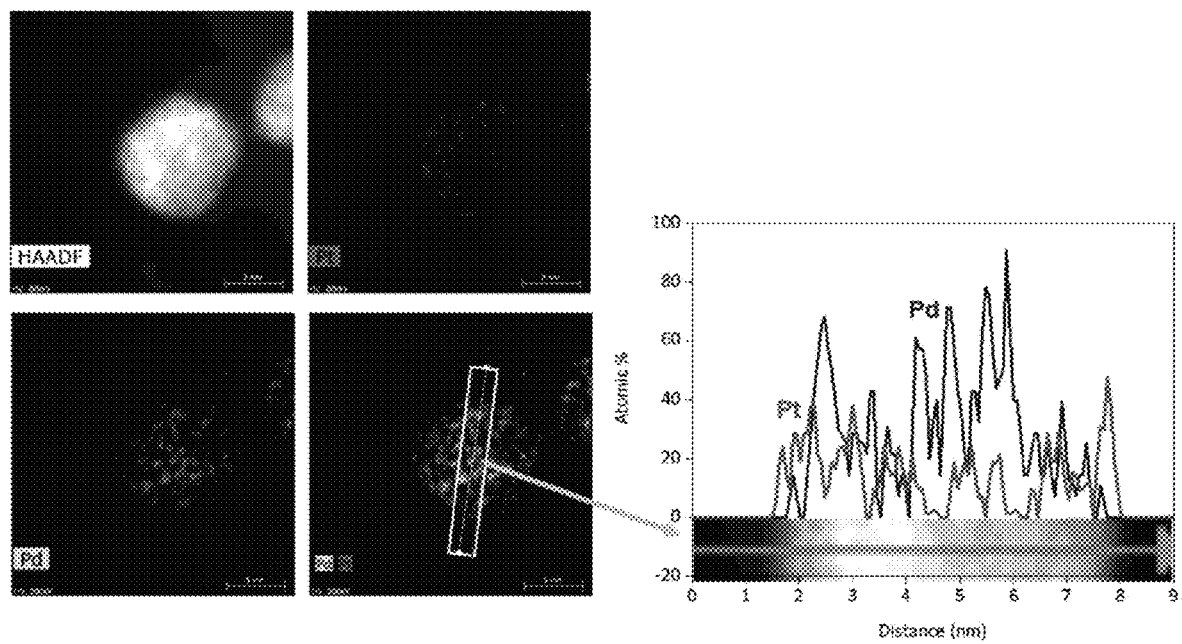

METHOD AND APPARATUS FOR MANUFACTURING CORE-SHELL CATALYST

CROSS-REFERENCE TO RELATED APPLICATIONS

This application is a divisional application of U.S. application Ser. No. 15/646,995, filed Jul. 11, 2017, which claims the priority of Korean Patent Application No. 10-2016-0166142 filed on Dec. 7, 2016 in the Korean Intellectual Property Office, the disclosure of which is incorporated herein by reference.

BACKGROUND

Field

The present disclosure relates to a manufacturing method and a manufacturing apparatus capable of producing uniform nanoscale core-shell catalysts in large quantities.

Description of the Related Art

In the current situation in which worldwide interests and researches on next generation energy sources are being progressively increased due to exhaustion of fossil fuel resources, a hydrogen fuel cell is an environmentally-friendly energy source that does not emit contaminants, and as a result, a lot of researches on the hydrogen fuel cell are being conducted in scientific and industrial fields. In particular, it is expected that the hydrogen fuel cell for an automobile will be substituted for an engine using the existing petroleum, and the industry related to the hydrogen fuel cell will be an immensely powerful industry having great market potentials.

A proton exchange membrane fuel cell (PEMFC) refers to a system that generates electric power by electrochemically and directly reacting hydrogen, in which hydrogen is oxidized at a negative electrode and water is obtained at a positive electrode as oxygen is reduced, and the proton exchange membrane fuel cell may be called an environmentally-friendly energy source that does not emit other contaminants. The hydrogen fuel cell is advantageous because the hydrogen fuel cell has a comparatively low operating temperature of about 50 to 100° C., and has high energy density. For this reason, the hydrogen fuel cell may be used for the purpose of not only an engine for an automobile but also a small-sized household energy source. However, the hydrogen fuel cell has problems to be solved, such as low output energy density caused by a low reaction rate, a use of a large amount of platinum catalysts, and a necessity of removing moisture created on an electrode surface.

Recently, to make the hydrogen fuel cell commercially available, a number of researches are being conducted in order to solve the aforementioned problems, and particularly, researches for improving electric power conversion efficiency by improving a fuel cell catalyst are conceived as very important researches. It has been known that among metal catalysts used as the fuel cell catalyst for reducing oxygen, the platinum catalyst exhibits the largest activity. However, as a demand for platinum is increased, the price of platinum is increased over five times for a recent decade. As the price of platinum is increased, there is a need for catalyst synthesis for reducing a usage amount of platinum and increasing an electrical activity compared to pure platinum.

Recently, researches on synthesis of a catalyst having a core-shell shape are actively conducted in order to meet the aforementioned need.

In the related art related to the synthesis of the catalyst having a core-shell structure, Korean Patent Application Laid-Open No. 2009-0045412 proposes an electrode catalyst in which a catalyst particle, which includes a M-core/M-shell structure and has an inner particle core made of palladium and an outer particle shell made of platinum, is supported on a support (carbon black or graphite), but there is a problem in that a catalyst activity somewhat deteriorates because colloidal dispersion is not removed.

In addition, Korean Patent Application Laid-Open No. 2006-0082595 proposes a method of manufacturing an electrode catalyst for a fuel cell, which manufactures a precursor solution by dissolving a precursor compound made of palladium which include a metal compound particle made of palladium, and an active particle having a core-shell structure including a platinum or platinum-containing alloy coating layer formed on all surfaces of the particle, and drying the metal compound particle in a state of being supported on a catalyst carrier, but there is a problem in that sizes of the catalyst particles are not uniform.

In addition, according to a reported thesis, a palladium-platinum core-shell nanoparticle catalyst, which was synthesized by using an underpotential deposition (UPD) method, exhibited an activity per unit mass, which is five times higher, because due to an influence of palladium which is a core material, an interaction with an intermediate, which is produced when reducing platinum and oxygen existing on a surface, was weakened [R. R. Adzic, et al., J. Am. Chem. Soc. 2009, 131, 17298]. In addition, it was reported that the palladium-platinum core-shell nano catalyst, which was synthesized as described above, also has high durability as a catalyst because stability of platinum in which the core material forms a shell is increased [R. R. Adzic, et al., Angew. Chem. Int. Ed. 2010, 49, 8602].

Specifically, the method includes a step of depositing a thin layer having a metal atom, which has a lower reduction potential than that of platinum, on a precious metal core particle. Some manufacturers use an underpotential deposition process in order to deposit a copper atom as metal having lower reduction potential. Then, the core particle is mixed with a solution containing platinum salts. The platinum atom in the solution is voluntarily substituted with a copper atom on a precious metal core in order to create a thin layer having the platinum atom on the precious metal core.

The synthesis method according to the reported thesis has a problem in that because the catalyst is synthesized on the carbon electrode which is a working electrode, the mass production is not easy and it is difficult to synthesize nanoparticles having a uniform size.

Meanwhile, when a target (solid) supported to a liquid (solvent) is irradiated with a laser beam, a solid surface is instantaneously vaporized at a high temperature, neutral atoms, molecules, positive and negative ions, clusters, electrons, are photons are explosively emitted, and this situation is called laser ablation. The laser ablation is applied to fields of production of ultrafine particles, microfabrication, thin film forming, element analyses, laser nuclear fusion, and the like. However, the solvent flows when the target is irradiated with the laser beam, and a height of the solvent, which is measured at a focal point controlled in advance, varies due to the flow of the solvent when emitting the laser beam, such that a focal point for emitting the laser beam is changed, and the laser beam is refracted, and as a result, there is a problem in that it is difficult to manufacture the particles having a uniform diameter.

SUMMARY

An object of the present disclosure is to provide a method and an apparatus for manufacturing a nanoscale uniform core-shell catalyst, which are capable of improving thickness uniformity of shell metal with which a surface of a core particle is coated, by continuously providing uniform nanoscale metal core particles and increasing an area of a reaction chamber where electric potential may be controlled.

In addition, another object of the present disclosure is to provide a method and an apparatus for manufacturing a core-shell catalyst, which are capable of manufacturing core particles having a uniform diameter by minimizing a change in height of a surface of a solution when a laser is emitted, and thus enabling a continuous operation at a focal point controlled in advance.

In addition, still another object of the present disclosure is to provide a method and an apparatus for manufacturing a core-shell catalyst, which are capable of simultaneously manufacturing a core particle and forming a shell on the core in a single reaction chamber, checking in real time a reaction condition and the like, measuring in real time a particle diameter of the manufactured core-shell catalyst, having excellent productivity because of continuous reactions, and maintaining uniformity of a size of the core-shell catalyst.

The present disclosure provides a method of manufacturing a core-shell catalyst, the method including: manufacturing a metal nanoparticle by emitting a laser beam to a solution containing a metal ingot; dispersing a support body into the manufactured metal nanoparticle solution, mixing a copper precursor-containing solution with the mixture, and coating a metal nanoparticle with copper by providing electric potential higher than oxidation and reduction potentials of copper; and manufacturing a particle in the form of a core-shell in which the metal nanoparticle is coated with platinum by mixing a solution containing a platinum ion with a solution containing the manufactured metal nanoparticle coated with copper and inducing a galvanic displacement reaction.

In addition, the present disclosure provides an apparatus for manufacturing a core-shell catalyst, the apparatus including: a titanium reaction chamber in which a part of a chamber upper surface is made of a glass material, a lower surface is a working electrode, and the working electrode is joined to one of left and right surfaces of the titanium reaction chamber; a reaction solution which is accommodated in the reaction chamber; a metal ingot holder which is accommodated in the reaction chamber; a metal ingot capsule which is accommodated on the metal ingot holder; a reference electrode and a counter electrode which are supported in the reaction solution; a power source unit which applies voltage to the electrodes; a solution injecting unit which injects a mixture solution including a copper precursor and a platinum precursor into the reaction chamber; a laser light source which emits energy to the metal ingot; a display unit which measures and displays, in real time, a copper precursor content and a platinum precursor content in the reaction chamber, the type of reaction solution, applied voltage, an output of the emitted laser beam; and a particle diameter measuring device which measures a particle diameter of the metal nanoparticle manufactured in the reaction chamber.

According to the method and the apparatus for manufacturing a core-shell catalyst according to the present disclosure, the amount of reactants contained in the reaction chamber, the type of reaction solution, an output of the emitted laser beam, applied voltage, and the amount of core-shell catalysts obtained by the reaction may be checked in real time by the additional measuring device, and as a result, it is possible to continuously manufacture core-shell catalysts in large quantities.

In addition, according to the method and the apparatus for manufacturing a core-shell catalyst according to the present disclosure, it is possible to continuously manufacture core particles having a uniform diameter at a controlled focal length by minimizing a change in height of the solvent when a laser is emitted.

In addition, according to the method and the apparatus for manufacturing a core-shell catalyst according to the present disclosure, it is possible to maintain a uniform size of the particle of the manufactured core-shell catalyst by continuously providing core particles having a uniform size, which are manufactured as described above, and significantly improving an area of the reaction chamber where the electric potential may be controlled such that a thickness of shell metal with which the surface of the core particle is coated is uniform.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 1, 2, 3, and 4 are views illustrating an apparatus for manufacturing a core-shell catalyst according to an exemplary embodiment of the present disclosure; and FIG. 5 is a view illustrating a TEM photograph of the core-shell catalyst manufactured in accordance with the exemplary embodiment of the present disclosure.

DETAILED DESCRIPTION OF THE EMBODIMENT

The present disclosure relates to a manufacturing method and a manufacturing apparatus capable of producing uniform nanoscale core-shell catalysts in large quantities.

A method of manufacturing a core-shell catalyst according to the present disclosure includes: a step of manufacturing a metal nanoparticle by emitting a laser beam to a solution containing a metal ingot; a step of dispersing a support body into the manufactured metal nanoparticle solution, mixing a copper precursor-containing solution with the mixture, and then coating the metal nanoparticle with copper by providing electric potential higher than oxidation and reduction potentials of copper; and a step of manufacturing a particle in the form of a core-shell in which the metal nanoparticle is coated with platinum by mixing a solution containing a platinum ion with a solution containing the manufactured metal nanoparticle coated with copper and inducing a galvanic displacement reaction.

Hereinafter, the respective steps will be specifically described.

First, the metal nanoparticle is manufactured by emitting the laser beam to the solution containing the metal ingot.

The metal ingot is metal used as a core, and may be appropriately selected in accordance with an intended type of catalyst, and for example, one or more types selected from the group consisting of palladium, rhodium, iridium, ruthenium, gold, iron, cobalt, nickel, manganese, chromium, vanadium, titanium, niobium, molybdenum, and tungsten may be used.

The type of the metal ingot is not particularly limited as long as the metal ingot is typically used in the art and may create particle by means of the laser beam, and for example, a thin film type or a wire type may be used.

The laser beam may be appropriately adjusted in accordance with the type, size, or the like of metal ingot, and for example, energy of 0.1 to 40 J/cm$^2$ may be used for a palladium metal ingot having a size of 1 nm to 30 nm in a case in which a pulse electromagnetic wave is used. If a range of the laser beam is below the aforementioned range, a size of the particle is increased, and if the range of the laser beam is above the aforementioned range, there may occur a problem such as serious heat generation and difficulty in constantly adjusting a focal point.

A solvent, which is used for the solution containing the metal ingot, is not particularly limited as long as the solvent does not adversely affect laser ablation efficiency, and the solvent may be appropriately adjusted in accordance with the type, density, a boiling point, surface tension, a dielectric constant, and the like of the metal ingot. The solvent is typically acidic, but pH of the solvent may be adjusted in accordance with an environment and a purpose. As an example, the palladium metal ingot may contain one or more types of solvents selected from water, sulfuric acid, and various hydrocarbon-based compounds such as ethanol, acetone, ethylene glycol, and polymeric materials.

The metal ingot may have various shapes, such as a sheet shape, a foil shape, and a wire shape in accordance with a design condition of a reaction chamber.

Next, the support body is dispersed into the manufactured metal nanoparticle solution, the copper precursor-containing solution is mixed with the mixture, and then the metal nanoparticle is coated with copper by providing electric potential higher than oxidation and reduction potentials of copper.

The support body may be carbon or metal oxide.

A solvent, which is used to manufacture the nanoparticle, is not particularly limited as long as the solvent does not adversely affect the laser ablation efficiency. A reaction solution is typically acidic, but pH of the reaction solution may be adjusted in accordance with an environment and a purpose.

A solvent used for the copper precursor-containing solution may contain one or types of solvents selected from sulfuric acid, perchloric acid, hydrochloric acid, and various electrolytes.

In this case, the amount of copper precursors existing in the solvent is proportional to the amount and a surface area of the metal nanoparticles existing in advance, and the amount of platinum precursors is also proportional to the amount and a surface area of the metal nanoparticle particles, but the platinum precursors may exist at a level slightly exceeding that of the metal nanoparticle particles. If the copper precursor content is too low, a surface of the metal nanoparticle cannot be sufficiently coated, and as a result, a platinum shell, which is a resultant product, cannot be sufficiently established.

Particularly, 3 to 60 wt % of a total of solid-phase particles of the metal nanoparticles may be contained in the solution, and the copper precursor-containing solution may contain the copper precursor of 10 mM to 1 M.

The step of coating the metal nanoparticle with copper is performed by providing electric potential higher than oxidation and reduction potentials of copper, specifically, in a range of 0.34V to 0.46V (vs. SHE). If the electric potential is below 0.24 V, electroplating occurs at an excessive level, and if the electric potential is above 0.46V, there may occur a problem in that a copper atom is not reduced on the surface of the metal nanoparticle but maintained in the form of an ion in the solution, such that the particle having a core-shell shape is not manufactured.

Next, the particle in the form of a core-shell in which the metal nanoparticle is coated with platinum is manufactured by mixing the solution containing the platinum ion with the solution containing the manufactured metal nanoparticle coated with copper and inducing the galvanic displacement reaction.

Regarding the substitution between the copper and the platinum with which the metal nanoparticle is coated, the displacement between the copper and the platinum naturally occurs due to relatively high oxidation and reduction potentials of the platinum when the metal nanoparticle coated with the copper is positioned in the solution in which the platinum ion exists.

The platinum precursor contained in the solution containing the platinum ion may exist at a level which is proportional to the amount and the surface area of the metal nanoparticle particle and slightly exceeds the amount and the surface area of the metal nanoparticle particle. If the platinum precursor content is too low, the surface of the metal nanoparticle cannot be sufficiently coated, and if the platinum precursor content is too high, there is a problem in that an irregularly large lump is formed, and thus it is difficult to obtain a core-shell-shaped electrode catalyst having a uniform shell. In particular, the platinum precursor content may be in a range of 10 mM to 1 M.

The copper precursor and the platinum precursor are not particularly limited to precursors which are typically used in the art, but the purpose may be achieved even though any material is utilized, as long as the primary coating by the UPD and the displacement coating by the galvanic displacement may form a pair in consideration of equilibrium potential ranges of the respective materials.

Meanwhile, the present disclosure is characterized by an apparatus for manufacturing a core particle by using a laser and for manufacturing a core-shell particle by using the manufactured core particle.

The present disclosure may use separate apparatuses for manufacturing the core particle and for manufacturing the core-shell by forming a shell on the core particle, respectively, or may use an apparatus for simultaneously manufacturing the core particle and the core-shell.

Specifically, FIG. 1 illustrates an apparatus for simultaneously performing a step of manufacturing a core particle by using a laser in one reaction chamber, and a step of forming a shell on the core particle.

Referring to FIG. 1, the apparatus includes: a titanium reaction chamber 40 in which a part of a chamber upper surface is made of a glass material, a lower surface is a working electrode 20, and the working electrode 20 is joined to one of left and right surfaces; a reaction solution 100 which is accommodated in the reaction chamber; a metal ingot holder 2 which is accommodated in the reaction chamber; a metal ingot capsule which is accommodated on the metal ingot holder; a reference electrode 10 and a counter electrode 15 which are supported in the reaction solution; a power source unit 30 which applies voltage to the electrodes; a solution injecting unit 50 which injects a mixture solution including a copper precursor and a platinum precursor into the reaction chamber; a laser light source 1 which emits energy to the metal ingot; a display unit 70 which measures and displays, in real time, a copper precursor content and a platinum precursor content in the reaction chamber, the type of reaction solution, applied voltage, an output of an emitted laser beam; and a particle diameter measuring device 80 which measures a particle diameter of the manufactured metal nanoparticle in the reaction chamber.

FIG. 2 illustrates an apparatus which is separately divided into a reactor for manufacturing a core particle by using a laser, and a reactor for forming a shell on the core particle, and the reactors perform separate reactions, respectively.

In addition, the apparatus for manufacturing a core-shell catalyst according to the present disclosure will be described with reference to FIG. 2. In the apparatus for manufacturing a core-shell catalyst, which has a first reactor A and a second reactor B, the first reactor A includes: a reaction chamber in which a part of an upper surface is made of a glass material 3, and a metal holder 2 on which a metal ingot is seated is formed in the reaction chamber; a metal ingot capsule which is accommodated on the metal ingot holder; a reaction solution 100 which is accommodated in the reaction chamber; a laser light source 1 which emits energy to the metal ingot; and a pump 4 which moves a nanoparticle solution created in the reaction chamber to a titanium reaction chamber of the second reactor, and the second reactor B includes: the titanium reaction chamber 40 in which a chamber lower surface is a working electrode 20, and the working electrode 20 is joined to one of left and right surfaces of the titanium reaction chamber 40; a reaction solution which is accommodated in the reaction chamber; a reference electrode 10 and a counter electrode 15 which are supported in the reaction solution; a power source unit 30 which applies voltage to the electrodes; a solution injecting unit 50 which injects a mixture solution including a copper precursor and a platinum precursor into the reaction chamber; and a nanoparticle injecting unit 90 which injects a nanoparticle created in the first reactor A into the reaction chamber.

FIGS. 3 and 4 illustrate a core particle manufacturing region (first region a) and a shell particle manufacturing region (second region b) which are designed to have different heights and different diameters in consideration of improvement on manufacturing efficiency.

Specifically, the core particle manufacturing region has a relatively low height such that the laser is easily be emitted to the metal ingot, the metal ingot is accommodated in a capsule having a hermetic structure impregnated in the reaction solution such that a flow of a solvent caused by the laser emission is minimized, and a height of the solvent, which is measured at a focal point controlled in advance, may be constantly maintained. Therefore, as described above, since a flow of the solvent is minimized and a distance between the metal ingot and the laser is reduced, it is possible to manufacture the core particles having a uniform diameter in large quantities.

In this case, the metal ingot capsule has the same structure and plays the same role even in FIGS. 1 and 2 provided as an example.

Referring to FIG. 3, an apparatus includes: a reaction chamber 110 in which the first region a and the second region b are separated, a height and a diameter of the second region are greater than a height and a diameter of the first region, and the first region and the second region are connected in a streamlined shape; a reaction solution 100 which is accommodated in the reaction chamber; a laser light source 1 which emits energy to the metal ingot in the first region; a solution injecting unit 50 which injects a mixture solution including a copper precursor and a platinum precursor into the second region; a display unit 70 which measures and displays, in real time, a copper precursor content and a platinum precursor content in the second region, the type of reaction solution, applied voltage, and an output of the emitted laser beam; a particle diameter measuring device 80 which measures a particle diameter of a metal nanoparticle manufactured in the second region; a reference electrode 10 and a counter electrode 15 which are supported in the reaction solution in the second region; a power source unit 30 which applies voltage to the electrodes; and a pump 4 which circulates a solution discharged from the second region to the first region, in which a part of an upper surface of the first region of the reaction chamber is made of a glass material, a metal ingot holder may be accommodated in the reaction chamber, and the metal ingot capsule may be accommodated on the metal ingot holder.

In addition, referring to FIG. 4, an apparatus includes: a reaction chamber 110 in which the first region a and the second region b are separated, a height and a diameter of the second region is greater than a height and a diameter of the first region, a variable orifice 5, which has a central portion protruding in a streamlined shape, is provided at an end in the first region; a reaction solution 100 which is accommodated in the reaction chamber; a laser light source 1 which emits energy to the metal ingot in the first region; a solution injecting unit 50 which injects a mixture solution including a copper precursor and a platinum precursor into the second region; a display unit 70 which measures and displays, in real time, a copper precursor content and a platinum precursor content in the second region, the type of reaction solution, applied voltage, and an output of the emitted laser beam; a particle diameter measuring device 80 which measures a particle diameter of a metal nanoparticle manufactured in the second region; a reference electrode 10 and a counter electrode 15 which are supported in the reaction solution in the second region; a power source unit 30 which applies voltage to the electrodes; and a pump 4 which circulates a solution discharged from the second region to the first region, in which a part of an upper surface of the first region of the reaction chamber is made of a glass material, a metal ingot holder may be accommodated in the reaction chamber, and the metal ingot capsule may be accommodated on the metal ingot holder.

In this case, the pump, which circulates the solution between the first region and the second region, is included in a separate solution circulation line outside the reaction chamber.

In particular, by using the apparatus according to the present disclosure as illustrated in FIGS. 3 and 4, core metal, which was manufactured by various chemicals and complicated processes (dispersion, reduction, rinsing, filtering, drying, heat treatment, etc.) in the related art, may be manufactured through a simple single process, and the core material may be continuously coated with a shell material immediately after the core material is manufacture, and as a result, it is possible to maximize process efficiency.

The metal ingot holder serves to fix the metal ingot, and in a case in which a thin film type metal ingot holder is used as an example, a thin film type metal ingot may be inserted and fixed in a detachable manner, and in a case in which a wire type metal ingot holder is used, a wire type metal ingot, which is injected by using a recess or the like, may be seated and fixed.

The reaction chamber may further include a stirrer therein in order to improve dispersion of metal particles and reaction efficiency.

The display unit and the particle diameter measuring device are not particularly limited as long as the display unit and the particle diameter measuring device are what are typically used in the art. In this case, the display unit displays data detected by a sensor supported in the reaction solution accommodated in the reaction chamber. The sensor is not particularly limited to a sensor which is typically used in the art, and a single sensor or a complex sensor, which may measure, in real time, a copper precursor content and a platinum precursor content in the reaction chamber, the type of reaction solution, applied voltage, and an output of the emitted laser beam, may be used.

Hereinafter, preferred Examples will be provided to help understanding of the present disclosure, but the following Examples are only provided to illustrate the present disclosure, and it will be apparent to those skilled in the art that various alterations and modifications are possible within the scope and technical spirit of the present disclosure, and it is natural that such alterations and modifications also fall within the accompanying claims.

EXAMPLE 1

A core-shell catalyst particle was manufactured by using the apparatus including: the titanium reaction chamber 40 in which a part of the chamber upper surface is made of a glass material, the lower surface is the working electrode 20, and the working electrode 20 is joined to the left surface of the titanium reaction chamber 40; the reaction solution 100 which is accommodated in the reaction chamber; the metal ingot holder 2 which is accommodated in the reaction chamber; the reference electrode 10 and the counter electrode 15 which are supported in the reaction solution; the power source unit 30 which applies voltage to the electrodes; the solution injecting unit 50 which injects the mixture solution including the copper precursor and the platinum precursor into the reaction chamber; the laser light source 1 which emits energy to the metal ingot 2; the display unit 70; and the particle diameter measuring device 80 (using the apparatus in FIG. 1).

First, a palladium ingot having a size of 2.5×2.5 cm$^2$ was seated on the metal ingot holder in the reaction chamber, and a sulfuric acid solution of 50 mM was injected. Thereafter, a palladium nanoparticle was manufactured by emitting a laser beam for a predetermined period of time.

Thereafter, a carbon material, which serves as a support body, was mixed and palladium in the form of Pd/C was supported in the reaction chamber, and 50 mM CuSO4, which is dissolved in the sulfuric acid solution, was injected. During a reaction process, nitrogen, argon, or the like, which is inert gas, was continuously purged. In order to bring the manufactured palladium in the form of Pd/C powder into a state of being sufficiently reduced, the palladium was maintained at about 0.46 V after two or more cycles in respect to a lower electric potential (about 0.46 V vs. SHE) region in open circuit electric potential (OCV), and the palladium was maintained until there was almost no change in electric current value for reducing palladium. In this case, stirring was performed once an hour so that physical contact was made between the powder and one electrode made of a titanium material. In this process, a Cu-UPD reaction was simultaneously performed, and a surface of the palladium was coated with a monoatomic layer or a double atomic layer of copper by adjusting voltage to 0.46 V or lower as necessary.

Thereafter, while the powder was sufficiently dispersed by intense stirring, a 50 mM platinum solution was injected into the reactor. In this case, it was not necessary to adjust separate electric potential, the injected platinum ion was substituted with copper, such that the particle in the form of a core-shell in which the surface of the palladium nanoparticle is coated with platinum was manufactured.

In this case, the reaction was performed while measuring, in real time, a copper precursor content and a platinum precursor content in the reaction chamber, the type of reaction solution, applied voltage, an output of the emitted light beam, and a particle diameter of the manufactured nanoparticle by means of the display unit and the particle diameter measuring unit.

EXAMPLE 2

A core-shell catalyst particle was manufactured by using the apparatus including: the first reactor A and the second reactor B, in which the first reactor A includes: the reaction chamber in which a part of the upper surface is made of a glass material, and the metal holder 2 on which the metal ingot is seated is formed in the reaction chamber; the reaction solution 100 which is accommodated in the reaction chamber; the laser light source 1 which emits energy to the metal ingot; and the pump 4 which moves the nanoparticle solution created in the reaction chamber to the titanium reaction chamber of the second reactor, and the second reactor B includes: the titanium reaction chamber 40 in which the chamber lower surface is the working electrode 20 and the working electrode 20 is joined to one of the left and right surfaces of the titanium reaction chamber 40; the reaction solution 100 which is accommodated in the reaction chamber; the reference electrode 10 and the counter electrode 15 which are supported in the reaction solution; the power source unit 30 which applies voltage to the electrode; the solution injecting unit 50 which injects the mixture solution including the copper precursor and the platinum precursor into the reaction chamber; and the nanoparticle injecting unit 90 which injects the nanoparticle created in the first reactor A into the reaction chamber (using the apparatus in FIG. 2).

First, a palladium ingot having a size of 2.5×2.5 cm$^2$ was seated on the metal ingot holder in the reaction chamber of the first reactor, and a sulfuric acid solution of 50 mM was injected. Thereafter, a palladium nanoparticle was manufactured by emitting a laser beam for a predetermined period of time.

Thereafter, the palladium nanoparticle-containing solution, which is manufactured in the first reactor, is moved to the titanium reaction chamber of the second reactor by using the pump.

A carbon material, which serves as a support body, was mixed and palladium in the form of Pd/C was supported in the titanium reaction chamber, and 50 mM CuSO4, which is dissolved in the sulfuric acid solution, was injected. During a reaction process, nitrogen, argon, or the like, which is inert gas, was continuously purged. In order to bring the manufactured palladium in the form of Pd/C powder into a state of being sufficiently reduced, the palladium was maintained at about 0.46 V after two or more cycles in respect to a lower electric potential (about 0.46 V vs. SHE) region in open circuit electric potential (OCV), and the palladium was maintained until there was almost no change in electric current value for reducing palladium. In this case, stirring was performed once an hour so that physical contact was made between the powder and one electrode made of a titanium material. In this process, a Cu-UPD reaction was simultaneously performed, and a surface of the palladium was coated with a monoatomic layer or a double atomic layer of copper by adjusting voltage to 0.46 V or lower as necessary.

Thereafter, while the powder was sufficiently dispersed by intense stirring, a 50 mM platinum solution was injected into the reactor. In this case, it was not necessary to adjust separate electric potential, the injected platinum ion was substituted with copper, such that the particle in the form of a core-shell in which the surface of the palladium nanoparticle is coated with platinum was manufactured.

In this case, the reaction was performed while measuring, in real time, a copper precursor content and a platinum precursor content in the reaction chamber, the type of reaction solution, applied voltage, an output of the emitted light beam, and a particle diameter of the manufactured nanoparticle by means of the display unit and the particle diameter measuring unit.

FIG. 5 is a TEM photograph of the particle in the form of the core-shell manufactured according to the present disclosure, and it can be seen that a size of the particle is at a level of 2 nm to 8 nm.

What is claimed is:

1. An apparatus for manufacturing a core-shell catalyst, the apparatus comprising:
    a reaction chamber which is divided into a first region and a second region, in which a height and a diameter of the second region are greater than a height and a diameter of the first region so that a flow of a solvent caused by a laser emission is minimized and a height of the solvent measured at a focal point controlled in advance is constantly maintained, and the first region and the second region are connected in a streamlined shape;
    a reaction solution which is accommodated in the reaction chamber;
    a laser light source which emits energy to a metal ingot in the first region, wherein an output of the laser light source is 0.1 to 40 J/cm2;
    a solution injecting unit which injects a mixture solution including a copper precursor and a platinum precursor into the second region;
    a display unit which measures and displays, in real time, a copper precursor content and a platinum precursor content in the second region, a type of the reaction solution, applied voltage, and the output of the emitted laser source;
    a particle diameter measuring device which measures a particle diameter of a metal nanoparticle manufactured in the second region;
    a reference electrode and a counter electrode which are supported in the reaction solution in the second region;
    a power source unit which applies voltage to electrodes; and
    a pump which circulates a solution discharged from the second region to the first region,
    wherein a part of an upper surface in the first region of the reaction chamber is made of a glass material, a metal ingot holder is accommodated in the reaction chamber, and a metal ingot capsule is accommodated on the metal ingot holder.

2. The apparatus according to claim 1, wherein the metal ingot capsule has a capsule shape having a hermetic structure in which the metal ingot is impregnated in the reaction solution.

3. An apparatus for manufacturing a core-shell catalyst, the apparatus comprising:
    a reaction chamber which is divided into a first region and a second region, in which a height and a diameter of the second region are greater than a height and a diameter of the first region so that a flow of a solvent caused by a laser emission is minimized and a height of the solvent measured at a focal point controlled in advance is constantly maintained, and a variable orifice, which has a central portion protruding in a streamlined shape, is provided at an end in the first region;
    a reaction solution which is accommodated in the reaction chamber;
    a laser light source which emits energy to a metal ingot in the first region, wherein an output of the laser light source is 0.1 to 40 J/cm2;
    a solution injecting unit which injects a mixture solution including a copper precursor and a platinum precursor into the second region;
    a display unit which measures and displays, in real time, a copper precursor content and a platinum precursor content in the second region, a type of the reaction solution, applied voltage, and the output of the emitted laser source;
    a particle diameter measuring device which measures a particle diameter of a metal nanoparticle manufactured in the second region;
    a reference electrode and a counter electrode which are supported in the reaction solution in the second region;
    a power source unit which applies voltage to the electrodes; and
    a pump which circulates a solution discharged from the second region to the first region,
    wherein a part of an upper surface in the first region of the reaction chamber is made of a glass material, a metal ingot holder is accommodated in the reaction chamber, and a metal ingot capsule is accommodated on the metal ingot holder.

4. The apparatus according to claim 3, wherein the metal ingot capsule has a capsule shape having a hermetic structure in which the metal ingot is impregnated in the reaction solution.

* * * * *